United States Patent

Buri et al.

Patent Number: 5,628,233
Date of Patent: May 13, 1997

[54] TRANSMISSION WITH INTERMEDIATE PLATE CONNECTED TO TRANSMISSION CASING BY GEAR SUPPORTS

[75] Inventors: Gerhard Buri, Markdorf; Josef Bader, Friedrichshafen, both of Germany

[73] Assignee: ZF Friedrichshafen AG, Friedrichshafen, Germany

[21] Appl. No.: 535,145

[22] PCT Filed: Apr. 9, 1994

[86] PCT No.: PCT/EP94/01204

§ 371 Date: Nov. 21, 1995

§ 102(e) Date: Nov. 21, 1995

[87] PCT Pub. No.: WO94/25780

PCT Pub. Date: Nov. 10, 1994

[30] Foreign Application Priority Data

Apr. 23, 1993 [DE] Germany .............. 43 13 345.2

[51] Int. Cl.$^6$ .................................. F16H 57/02
[52] U.S. Cl. ............................. 74/606 R; 74/411.5
[58] Field of Search ................ 74/606 R, 411.5; 475/269

[56] References Cited

U.S. PATENT DOCUMENTS

| | | |
|---|---|---|
| 3,234,808 | 2/1966 | Nelson ............... 74/606 R X |
| 3,745,847 | 7/1973 | Worner et al. ............... 74/411.5 X |
| 4,231,622 | 11/1980 | Paullin ............... 74/606 R X |
| 4,598,599 | 7/1986 | Ikemoto ............... 74/411.5 |
| 4,706,520 | 11/1987 | Sivalingam ............... 74/411.5 X |
| 4,793,200 | 12/1988 | McDonald . | 
| 5,370,014 | 12/1994 | Pigozzi et al. ............... 74/606 R X |
| 5,372,052 | 12/1994 | Bender ............... 74/606 R |

FOREIGN PATENT DOCUMENTS

| | | |
|---|---|---|
| 0025823 | 4/1981 | European Pat. Off. . |
| 0437663 | 7/1991 | European Pat. Off. . |
| 0444497 | 9/1991 | European Pat. Off. . |
| WO90/10806 | 9/1990 | WIPO . |
| WO93/15339 | 8/1993 | WIPO ............... 74/411.5 |

*Primary Examiner*—Charles A. Marmor
*Assistant Examiner*—Mary Ann Battista
*Attorney, Agent, or Firm*—Davis and Bujold

[57] ABSTRACT

A range-change gearbox arrangement on the main casing of a multi-ratio gearbox in which the clutch of the range-change gear is fitted in a second casing and a part of the clutch is supported by an intermediate plate located between the main and second casings. The intermediate plate (4) is secured to the main casing (2) and is supported thereon by a plurality of studs (6) which may be bearing studs for gear-wheels (34), especially reverse gear intermediate wheels.

14 Claims, 3 Drawing Sheets

TRANSMISSION WITH INTERMEDIATE PLATE CONNECTED TO TRANSMISSION CASING BY GEAR SUPPORTS

The invention concerns an arrangement on a transmission casing.

BACKGROUND OF THE INVENTION

In a multi-ratio transmission produced in large quantities, it is already known to situate the planetary gear set of a range-change group, together with the clutch, in an area outside that of the main transmission. The planetary gear set and the clutch are here separated from the main transmission by a partition wall, where shafts and gearshift rods of the main transmission can also be situated. For the support of torques exerted, for instance, by a clutch body of the clutch, the intermediate wall must be designed, for instance, with reinforcing webs or fins, so as to be able to resist the torques that appear. For this purpose, said wall can be firmly clamped between the main transmission and the casing of the range-change group placed outside. This creates difficulties in the aluminum, as result of the necessary pressure.

Idler gears are often supported in the main part of the transmission by bearing studs anchored in the casing of the transmission. The intermediate gears of the reverse gear, in particular, require a separate support, since these (sic) are not connected with the countershafts of the transmission.

A simplified construction of the transmission contributes to the saving of material and assembly time. It is often advantageous here to combine different parts of the assemblies into one structural part, that is, accomplish several functions with only one suitably designed part.

WO 90/10806 has thus disclosed a main casing of a multi-ratio transmission in which is situated a range-change transmission. One element of the clutch is here supported over an intermediate plate of the transmission casing, said intermediate plate being clamped between the casing parts of the main transmission and the range-change transmission. But the intermediate plate shown there is not capable of assuming other functions in the transmission.

SUMMARY OF THE INVENTION

The problem to be solved by the invention is to develop an arrangement so that one part of a transmission can assume other functions.

According to the invention an intermediate casing plate of the main transmission casing is designed in a manner such that the torque exerted on a clutch body of a gearshift device of the planetary gear set in the range-change transmission is supported on said intermediate plate of the casing during the shifting operation. The intermediate casing plate itself is in turn supported on the transmission casing via one or more studs. The studs mentioned here, in an added function as bearing studs, for instance, carry the intermediate gears of the reverse gear. Thus, the bearing stud, otherwise only secured to the casing, is provided with an extended function which can be used for a safer and more efficient support of the cropping out torque and needs no special reinforcement of the intermediate plate of the transmission.

The transmission intermediate plate itself is firmly connected with the transmission casing, for instance, by screw connections. The bearing studs can be supported in the transmission casing by different steps. The bearing studs, for instance, can be axially held by locking rings in holes in the casing. Here, two locking rings are inserted in corresponding cavities on the external diameter of the bearing stud. Both locking rings are respectively supported against casing parts, so that an axial displacement of the bearing studs within the holes is not possible. A support in which the bearing stud abuts on one side on one part in the interior of the transmission casing is likewise possible. On the other end of the bearing stud, on the external diameter thereof, is in turn provided a cavity in which a locking ring meshes. The locking ring here is disposed so as to be supported from inside against the casing and thus prevent an axial displacement of the bearing study in its hole.

The bearing studs can be designed solidly or also have themselves a hole. In such a hole could in turn be supported, for instance, the gearshift rod for an additional gearshift device. Bearing studs in both designs can at the same time extend up to the transmission intermediate plate or also extend out of the transmission casing through and past the intermediate plate.

Also possible is the design in the form such that the gear is supported on the stud, but axially held on one side by the transmission casing and on the other side by a sleeve or a ring also slipped on the bearing stud. The sleeve or ring is then in turn held on the transmission intermediate plate. For this purpose a cavity, for instance, is provided on the external diameter of the sleeve for a locking ring which is supported from the interior of the casing on the intermediate plate. At the same time, there is provided on the internal diameter of the sleeve, another locking ring which prevents an axial displacement of the bearing stud within the sleeve. At the other end, the bearing stud is held on the transmission casing by a third locking ring. The clutch ring of a gearshift device, which initiates the torque in the casing intermediate plate, is welded with the cover plate. But the combination in which the intermediate plate and clutch ring are made of one piece is also conceivable.

By the arrangement according to the invention, difficulties in the pressure of aluminum can be avoided, the same as the need of extra holes for bearing pins or studs for gears. Two-countershaft transmissions constitute a preferred area for use of the arrangement according to the invention.

The invention is not limited to the combination of features of the claims. In accordance with the problem, the expert can deduce other important possible combinations of claims and individual features of the claims.

BRIEF DESCRIPTION OF THE DRAWINGS

The invention is explained in detail with reference to drawings. In the drawings.

DESCRIPTION OF THE PREFERRED EMBODIMENTS

Figure 1:
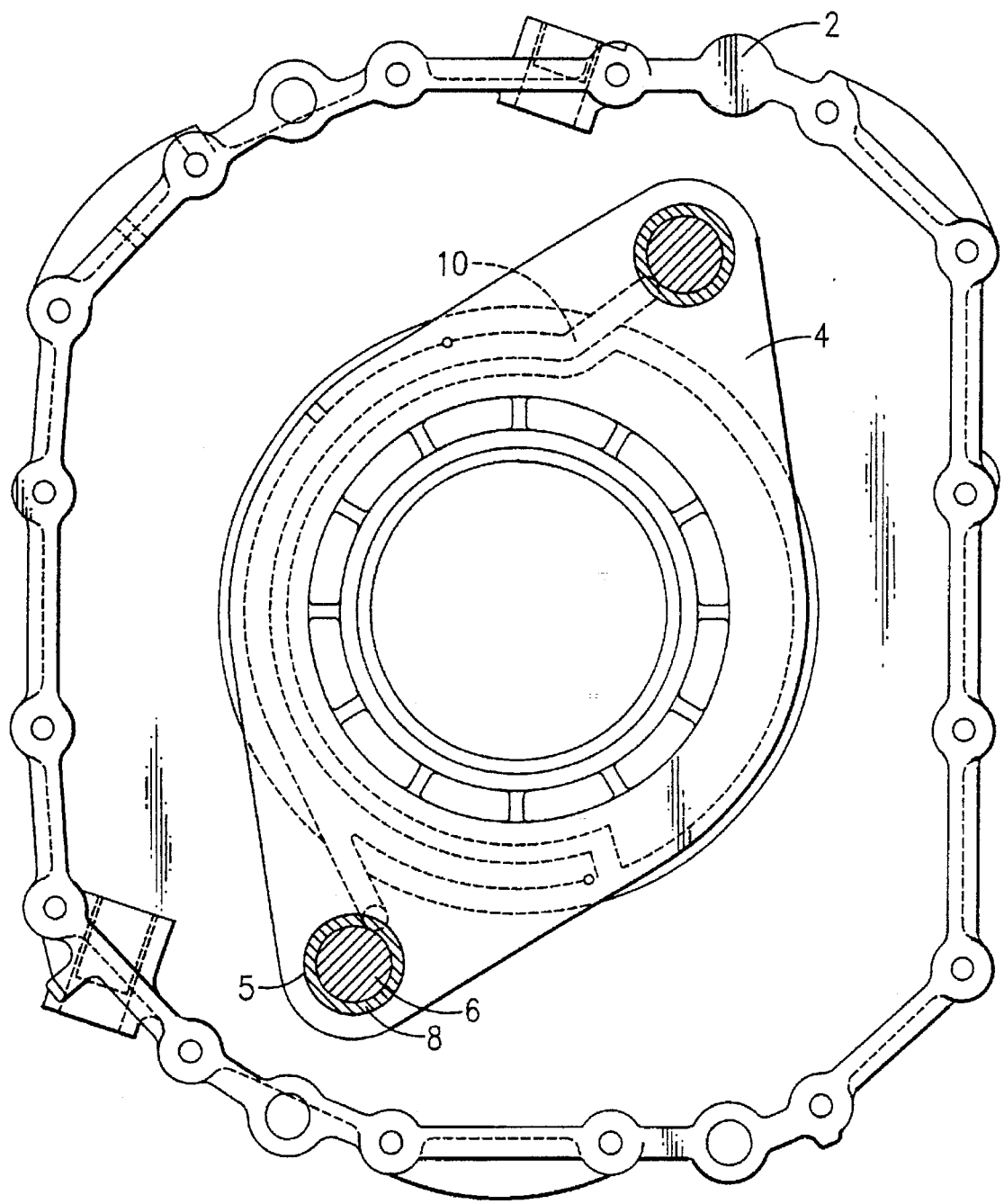
FIG. 1 is the representation of a transmission casing with the arrangement according to the invention.

FIG. 1 shows a fundamental representation of the arrangement according to the invention. An intermediate plate 4 is provided in the transmission casing 2. The intermediate plate 4 has recesses 5 in which studs 6 are placed. Said studs 6 can be passed into sleeves 8. The intermediate plate 4 is supported on the casing 2 via studs 6 and optional sleeves 8. Required lubricant can be supplied on bearing points of the studs via oil-supply lines 10. The oil-supply lines 10 can here be worked into the casing 2 as open ducts and are sealed by the intermediate plate 4.

Figure 2:
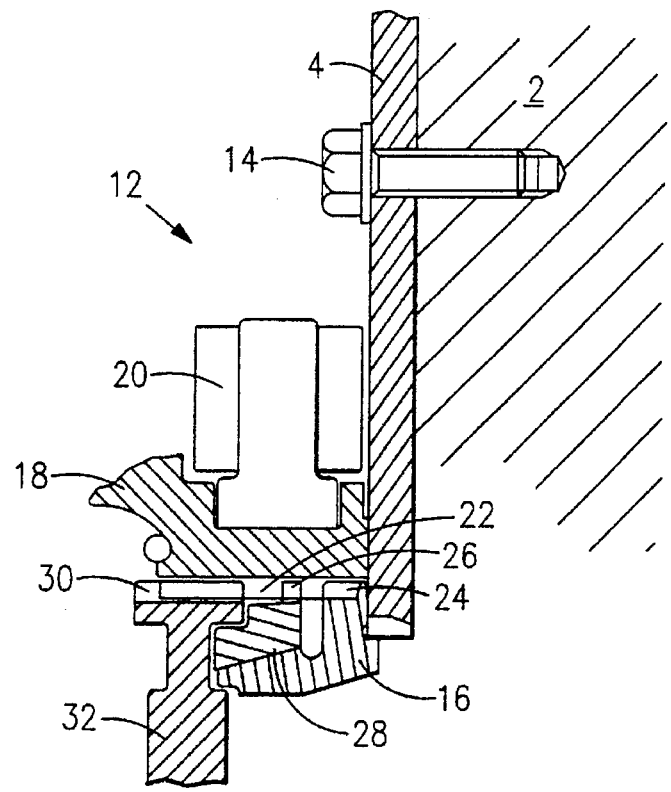
FIG. 2 is a representation of the coordination of the intermediate plate with a gearshift device.

FIG. 2 shows a segment from the transmission, in which a gearshift device is to be diagrammatically seen. The intermediate plate 4 is firmly connected with the transmission casing 2 by a screw connection 14. A clutch body 16 of the gearshift device 12 is fastened on the intermediate plate. The fastening can be made by welding. But as a development, it is also possible to provide the clutch body 16 directly as a component part of the intermediate plate 4. The gearshift sleeve 18 of the gearshift device 12 can be axially moved mechanically, hydraulically, pneumatically, or electrically with a device 20 by means not shown here. The internal toothing 22 of the gearshift sleeve 18 here engages with the external toothing 24 of the clutch body 16, the external toothing 26 of the synchronizer ring 28 and the external toothing 30 of the synchronizer body 32. FIG. 2 shows the state of the firm connection between synchronizer body 32 and clutch body 16. In FIG. 2 an axial displacement of the gearshift sleeve 18 means a movement to the right or to the left in the plane of the drawing.

The clutch body 16 of the gearshift device 12, for instance, of a planetary gear set (not shown here) of a range-change transmission, supports the torque exerted on said intermediate plate 4 during the gearshifting operation. The intermediate plate 4 itself is supported in turn via one or more studs 6 on the transmission casing 2.

Figure 3:
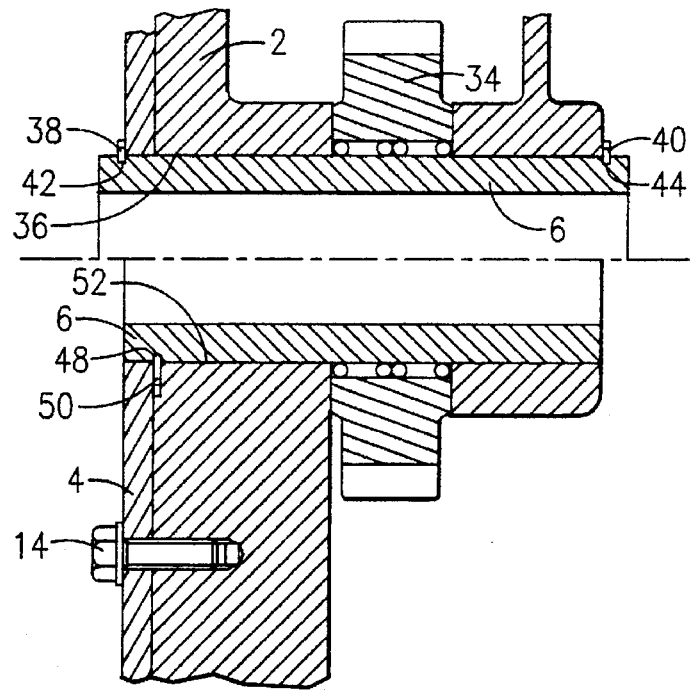
FIG. 3 is the representation of the support of the intermediate plate on the casing.

FIG. 3 shows that the studs 6 mentioned here, for instance, carry the intermediate gears 34 of the reverse gear in an additional function as bearing studs. Here are shown two variations of the support represented one time in the upper part and one time in the lower part. In this manner the stud 6, otherwise only fastened in the casing 2, is provided with another function for a safer and more efficient support of the cropping out torque and yet requires no special reinforcement of the intermediate plate 4.

The intermediate plate 4 itself is firmly connected with the transmission casing 2, such as by screw connections 14. The support of the intermediate plate 4 between parts of the casing (see FIG. 5) is also possible. The support of the bearing stud 6 in the transmission casing 2 can be obtained by different means. The bearing studs 6 can be held axially in holes 36 in the casing 2 by locking rings, for instance, as shown in the upper part of FIG. 3. Here two locking rings 38 and 40 are inserted in corresponding cavities 42, 44 in the external diameter of the bearing stud 6. Both locking rings 38, 40 are supported against the casing 2 so that an axial displacement of the bearing studs 6 within their holes 36 is not possible. Likewise possible, and shown in the lower part of FIG. 3, is a support where the bearing stud 6 has a cavity 48 in its external diameter in which meshes a locking ring 50. The locking ring 50 is here disposed so as to lie between the intermediate plate 4 and the casing 2, and thus an axial displacement of the bearing stud 6 in the hole 52 thereof is prevented.

The bearing studs 6 can be made solid or on the contrary have themselves a hole. In such a hole the gearshift rod 6 for another gearshift device could in turn be supported. Bearing studs 6 in both designs mentioned can extend up to the intermediate plate 4 or also extend out of the transmission casing 2 through and past the intermediate plate 4.

Figure 4:
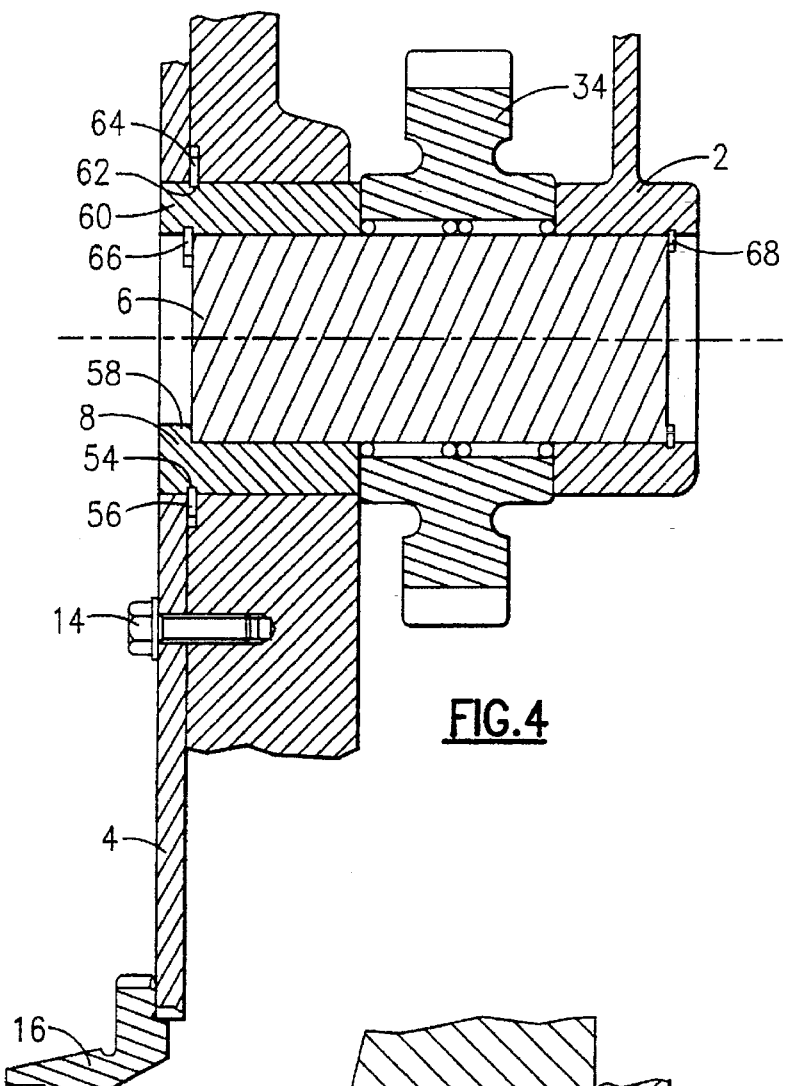
FIG. 4 is a variation according to FIG. 3.

Also possible, is the design according to FIG. 4 in the form such that the gears 34 is supported on the stud 6, but is axially held on one side by the transmission casing 2 and on the other side by a sleeve or a ring likewise slipped on the bearing stud. The sleeve or ring is then held between the intermediate plate 4 and the casing 2. For this purpose there is provided, for instance, in the lower part of FIG. 4, a cavity 54 in the external diameter of a sleeve 8, for a locking ring 56 which lies between casing 2 and intermediate plate 4. The sleeve 8 then has a projection 58 which prevents an axial displacement of the stud 6. In another development, in the upper part of FIG. 4, a sleeve 60 has a cavity 62 in the external diameter for a locking ring 64, which likewise lies between casing 2 and intermediate plate 4. At the same time there is provided on the internal diameter of the sleeve 60 another locking ring 66 which prevents an axial displacement of the bearing stud 6 within the sleeve 60.

In both cases, the bearing stud 6 can additionally be held on its other end on the transmission casing 2 by a third locking ring 68.

The clutch body 16 of a gearshift device, not shown here, which initiates a torque in the intermediate plate is welded with the intermediate plate 4. But the combination in which the intermediate plate 4 and the clutch body 16 are made of one piece is also conceivable.

By an axial lengthening of the bearing studs into other adjoining parts of the transmission, said transmission parts can be fixed in their position.

Figure 5:
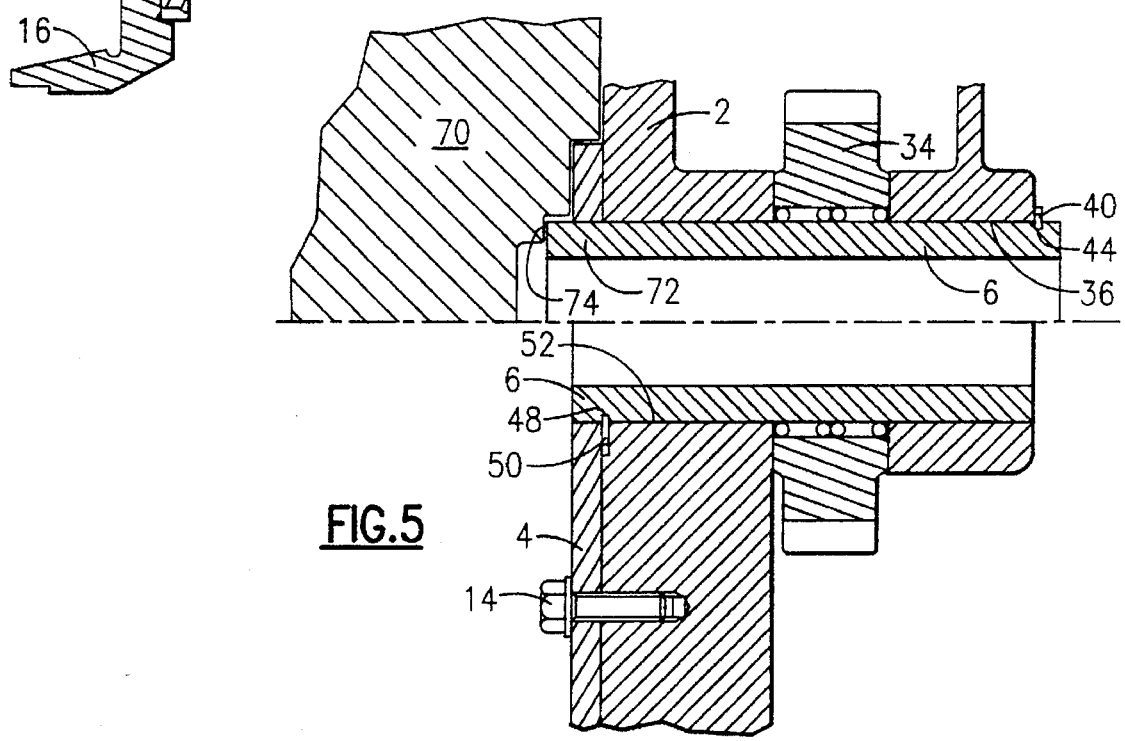
FIG. 5 is another variation of the arrangement according to the invention.

FIG. 5 diagrammatically shows a modified arrangement where the intermediate plate 4 is not fastened on a casing part 2 by a screw connection, but is held between two casing parts 2 and 70. The intermediate plate 4 here is not clamped between the casing parts 2 and 70. The torque exerted by the gearshift device is not transmitted here, but the intermediate plate 4 is held only in the axial direction of the shafts. The bearing stud 6 is here shown lengthened. The lengthened end 72 of the stud 6 meshes in the cavity 74 of the casing part 70. Thereby, the casing parts 2 and 70 can be fixed in their position relative to each other. The additional reference numerals of FIG. 5 correspond to those of FIG. 3.

We claim:

1. An arrangement for a range-change transmission of a multi-ratio transmission, said multi-ratio transmission including a main transmission casing (2) and said range-change transmission having a clutch (16, 18, 28, 32) which is at least partially separated from a remainder rest of said main transmission casing (2) by an intermediate plate (4), and at least one component (16) of said clutch (16, 18, 28, 32) being supported by said intermediate plate (4);

wherein said intermediate plate (4) is interconnected with said main transmission casing (2) by at least one stud (6), and said at least one stud (6) also supports a gear of said multi-ratio transmission.

2. A range-change transmission according to claim 1, wherein said intermediate plate (4) is interconnected with said main casing (2) by a plurality of said studs (6) and at least one of said plurality of said studs (6) supports said gear which is an intermediate gear of a reverse gear for said multi-ratio transmission.

3. A range-change transmission according to claim 1, wherein said intermediate plate (4) is interconnected with said main casing (2) by a plurality of said studs (6) and each of said plurality of said studs (6) is encased within a sleeve (8, 60).

4. A range-change transmission according to claim 1, wherein said intermediate plate (4) is interconnected with said main casing (2) by a plurality of said studs (6) and locking devices (38, 40, 50, 56, 64, 66, 68) are secured to each of said plurality of said studs (6) to prevent displacement of said plurality of said studs relative to said intermediate plate (4).

5. A range-change transmission according to claim 1, wherein said main transmission casing (2) has a plurality of oil-supply lines (10) formed therein and said oil-supply lines (10) are at least partially defined by and sealed by said intermediate plate (4).

6. A range-change transmission according to claim 1, wherein said intermediate plate (4) is interconnected with said main casing (2) by a plurality of said studs (6) and each of said plurality of said studs (6) supports a gear (34).

7. A range-change transmission according to claim 6, wherein each of said plurality of said studs (6) is hollow.

8. A range-change transmission according to claim 6, wherein at least one of said plurality of said studs (6) contacts at least one other component (70) of said multi-ratio transmission.

9. A range-change transmission according to claim 6, wherein each of said plurality of said studs (6) is hollow.

10. An arrangement for a range-change transmission of a multi-ratio said transmission, said transmission including a main transmission casing (2) and said range-change transmission having a clutch (16, 18, 28, 32) which is at least partially separated from a remainder rest of said main transmission casing (2) by an intermediate plate (4), and at least one component (16) of said clutch (16, 18, 28, 32) being supported by said intermediate plate (4);

wherein said intermediate plate (4) is interconnected with said main transmission casing (2) by at least one stud (6) and at least one fastener (14), and said at least one stud (6) supports a gear of said multi-ratio transmission.

11. A range-change transmission according to claim 10, wherein said main transmission casing (2) has a plurality of oil-supply lines (10) formed therein and said oil-supply lines (10) are at least partially defined by and sealed by said intermediate plate (4).

12. A range-change transmission according to claim 10, wherein said intermediate plate (4) is interconnected with said main casing (2) by a plurality of said studs (6) and each of said plurality of said studs (6) is encased within a sleeve (8, 60).

13. A range-change transmission according to claim 10, wherein said intermediate plate (4) is interconnected with said main casing (2) by a plurality of said studs (6) and locking devices (38, 40, 50, 56, 64, 66, 68) are provided to prevent displacement of said plurality of said studs relative to said intermediate plate (4).

14. An arrangement for a range-change transmission of a multi-ratio transmission, said multi-ratio transmission including a main transmission casing (2) and said range-change transmission having a clutch (16, 18, 28, 32) which is at least partially separated from a remainder rest of said main transmission casing (2) by an intermediate plate (4), and at least one component (16) of said clutch (16, 18, 28, 32) being supported by said intermediate plate (4);

wherein said intermediate plate (4) is interconnected with said main transmission casing (2) by at least one gear support (6) and at least one fastener (14); said at least one gear support (6) supports a gear of said multi-ratio transmission and said at least one gear support (6) is encased by a sleeve (8, 60); and said main casing (2) has at least one oil supply line formed therein which is at least partially defined by and sealed by said intermediate plate (4) and said at least one oil supply line has an outlet located adjacent said sleeve to supply oil thereto.

* * * * *